United States Patent [19]

Beizer

[11] Patent Number: 5,054,096

[45] Date of Patent: Oct. 1, 1991

[54] METHOD AND APPARATUS FOR CONVERTING DOCUMENTS INTO ELECTRONIC DATA FOR TRANSACTION PROCESSING

[75] Inventor: Mordechai M. Beizer, New York, N.Y.

[73] Assignees: Empire Blue Cross/Blue Shield; Sigma Computer Research Associates Inc., both of New York, N.Y.

[21] Appl. No.: 261,515

[22] Filed: Oct. 24, 1988

[51] Int. Cl.⁵ .............................................. G06K 9/36
[52] U.S. Cl. ...................................... 382/41; 340/734; 364/926.91; 382/61
[58] Field of Search ............................. 382/61, 41, 57; 358/183; 235/379; 340/721, 731, 734; 364/928.91

[56] References Cited

U.S. PATENT DOCUMENTS

| | | | |
|---|---|---|---|
| 4,264,808 | 4/1981 | Owens et al. | 382/7 |
| 4,408,181 | 10/1983 | Nakayama | 382/61 |
| 4,523,330 | 7/1985 | Cain | 382/7 |
| 4,542,378 | 9/1985 | Suganuma et al. | 382/61 |
| 4,710,868 | 12/1987 | Cocke et al. | 364/200 |
| 4,743,743 | 5/1988 | Fukatsu | 235/379 |
| 4,751,507 | 6/1988 | Hama et al. | 340/721 |
| 4,760,606 | 7/1988 | Lesnick et al. | 382/61 |
| 4,785,296 | 11/1988 | Tabata et al. | 340/731 |

Primary Examiner—David K. Moore
Assistant Examiner—Joseph Mancuso
Attorney, Agent, or Firm—Darby & Darby

[57] ABSTRACT

A system for electronically transaction processing a large volume of documents utilizes high speed local area networks to distribute images and data related to the documents. Connected to the high speed network are slower speed networks in which the processing takes place at workstations. The workstations are programmed with window presentations that sequentially magnify portions of the image of the document where relevant information may be found and corresponding locations on a form generated by the workstation. System operation is controlled by distributed programs.

30 Claims, 5 Drawing Sheets

METHOD AND APPARATUS FOR CONVERTING DOCUMENTS INTO ELECTRONIC DATA FOR TRANSACTION PROCESSING

BACKGROUND OF THE INVENTION

The present invention relates to optical scanning and optical character recognition systems, and more particularly, to means for converting documents into electronic data which can be extracted and manipulated.

Paper-intensive businesses and governmental agencies, e.g., insurance claim processing companies, credit card companies and taxing authorities, require large staffs and a great amount of physical plant. Also, they tend to operate inefficiently and are prone to make numerous errors. This leads to large operating expenses and customer dissatisfaction.

A paper-intensive company may receive tens of thousands of documents a day. This type of company can be of two general types, i.e. a transaction company or an archive company, and how a company handles the paper it receives will depend on the type of company it is. A transaction company must obtain data from the documents immediately. Then the data is transferred to a series of people who must act on it. The sequence of those transactions is usually well known. Once the transactions are complete, the data may be stored. While it must be possible to recover the stored data, only a small portion of it is ever likely to be retrieved. Also, the reasons for retrieval are random. A medical claims processing company is an example of a transaction company.

An archive company stores the information as soon as it is received and without processing. It may, for example, microfilm the received documents as a form of storage. A large percentage of the information stored by the archive type company will be retrieved, but the reasons for the requests for information will be well-known. A government agency that keeps birth certificates is an example of an archive company.

Archive companies can store data slowly without incurring much customer dissatisfaction, but transaction companies must complete their transactions quickly. Archive companies must be able to quickly retrieve all of their records, but transaction companies only need quick access to a small proportion of their records. For example, people expect to be able to get a copy of a birth certificate decades old in a few minutes, but would not expect a company to have fast access to a 1 year old medical claim. There will not be many requests for information on medical claims that have already been processed, but there are continuing requests for birth records.

The tens of thousands of documents received by a transaction type company may be of various types. These must be sorted and routed to the proper person for action. Thus, in a typical mailroom, there must be a large number of people who are trained to recognize the type of document received and to direct the document to the correct location. Also, the shear volume of paper makes it necessary to have a very large mailroom. This mailroom is usually an unattractive place for workers, being filled with seemingly endless stacks of papers. This leads to lowered moral and numerous errors. Such a physical plant is also costly.

Some of the problems of sorting incoming documents can be reduced by insisting on the use of standardized forms, especially those that are color-coded. However, if the customer mistakenly uses the wrong form, it can be directed to the wrong location and can be lost in the system for days or weeks among millions of other documents.

Once a document is sorted, it is then necessary to physically move it from one location to another for processing. This again requires numerous personnel and some amount of space. Also, the deliveries are slow, subject to error and unsightly. In addition, this may be a very inefficient step. There may be people in one location capable of processing the document who are not busy, but that location may be so remote from the sorted documents, e.g., in another town, that it is impractical to transmit the physical documents to that location. The people at the location where the document is located may be so busy that they cannot process it for days. To combat this it is often necessary to have excess staff at all locations, which is costly.

After a document reaches a person who must act on it substantively, the problems are not over. Critical information must be accurately retrieved from the document and evaluated. Typically, the information is loaded into a large computer which keeps track of the information and any action taken in response to it. There is considerable chance for error during the information retrieval and computer storage step, especially if the document is filled out by hand and the person processing the document is fatigued by the large volume. Further, in a health insurance or credit card business or in a taxing authority, there are usually complex rules on how to respond to or treat the information in a file. In some cases these rules must be looked up manually, a further source of error and delay. Even when the rules are stored on computer, it is necessary for the operator to properly code the information so that the computer applies the proper rules. For example, the rate of insurance reimbursement may vary for the same medical treatment, depending on the subscriber,s health insurance plan. Here the chance for error also exists.

Assuming that a document is properly acted upon and the correct information is delivered to the customer, e.g., a tax payer, that person may have questions. Thus, customer service representatives will at least need access to the computerstored information on the original document in order to respond to the questions. However, it is not unusual for the customer service representatives to need to see a copy of the original document and any correspondence with the client, not just the computer data. This means that someone will have to locate the physical file created in response to the original document.

When large numbers of documents are processed, it is impossible to keep many of the files convenient to a service representative. Thus, the files are usually stored off-site, e.g., on microfilm, and it may take days or weeks to retrieve the file and respond to customer inquiries.

As indicated, at various stages of the document handling process described, computers can help to reduce the errors. For example, it is known that typed and computerprinted documents can be optically scanned to recover an image of the document for storage in digital form or otherwise. Such storage can be on tape or optical disk. Also, optical character recognition units can extract data electronically from an image of a typed or computer printed document.

Electronic representations of data and documents can be transmitted from one location to another for subsequent processing. However, these devices are used only after a good deal of time has been spent manually processing the documents so that they are acceptable for handling by electronic equipment. In addition, an image of a single document can require up to 50,000 bytes of information. Thus, with a 2400 baud modem, it would take at least 20 seconds to transmit the image. If 100,000 documents are received in a day, it would take 2 million seconds to transmit them, but there are only 86,400 seconds in a day.

While various electronic components are available for easing the workload in paper-intensive businesses, there is presently no system known to the applicant which handles a high volume of documents, essentially eliminates the need for the physical document soon after it is received, reduces errors, reduces fatiguing labor, and allows transactions to be carried out at remote locations so the work load can be efficiently distributed.

SUMMARY OF THE INVENTION

The present invention is directed to a method and apparatus for handling a high volume of documents, essentially electronically, by immediately optically scanning and capturing the image of the document upon receipt, and carrying out all subsequent operations on the basis of the image of the scanned document.

In an illustrative embodiment of the invention a document is scanned by an optical scanner immediately upon receipt to form an electronic image of the document. If the document has relevant information typed or printed on it, the image is directed to an optical character reader ("OCR") where the information is extracted. The OCR can also retrieve information in the form of bar codes. The electronic image and extracted information are then placed together as a "record" on a company local area network ("LAN"). One or more computers acting as department servers are also connected to the company LAN. Based on a routing program, the image and information, i.e., the record, are captured by one of the servers and placed on a department LAN associated with that server.

Along the department LANs there are arranged computer workstations for the people who must process the image of the document, and any information from the OCR, in order to complete a transaction with a customer. Each workstation may perform the same function or the transaction may be divided into a series of steps with certain workstations performing one or more of the steps before the image and information are passed on to another workstation for further processing.

At the completion of the transaction, the images and the information as modified by the transaction, are sent back to the company LAN through the department server. This completed record is directed by the department server to archive storage, e.g., an optical disk which is connected to the company LAN. A mainframe computer may also be connected to the company LAN such that a summary of the record of the transaction in the form of a sequential audit trial of all of the transactions will be available for use in responding to customer inquiries. This mainframe computer, or a separate master index device connected to the company LAN, will keep track of the location of the record during the transaction and after storage so that the complete record, including the document image, may be retrieved.

In a preferred embodiment, the workstations are designed as programmed computers with high resolution monitor screens. These workstations operate with "windows" or separate screen segments in which different images can be displayed.

A program allows the creation of a form for information from the image of the document. With this program the form is displayed in one window and the document in another. Segments of the document are related to corresponding areas of the form by t he program.

During a data entry step of the transaction, the areas of the form where information is needed are sequentially highlighted along with the areas of the document where that information is found. Further, magnified images of both areas are positioned in additional windows located adjacent each other. As a result, information entered in the form automatically by the OCR can be easily checked. Where the information is handwritten, it can be typed in at the workstation with a minimum of errors. 20 The workstation may also be advantageously programmed with edit routines which will not allow information to be entered which does not fit the normal parameters. For example, in the year 1988 the program would reject a birth date of 1992 since that date has not yet occurred. This also reduces errors during manual data entry.

The department servers and the scanners can be programmed to route the data and images from the scanner to the proper department based on the type of document, the backlog in the various departments, the resources or capabilities of the department, or operator intervention. In some instances the information can be sent to remote locations for processing. These remote locations can be offices in other towns, but they can also be workstations in the homes of some employees. Thus, handicapped employees or those with young children can work from their homes.

The records stored can be of any type. However, the present invention is particularly useful where an image of the original document is helpful, e.g., medical records of x-rays, CAT scans, EKGs, etc. If a central repository of such medical records is maintained, scanners can be located remotely from the company LAN, e.g., at individual hospitals. This data could then be sent to the company LAN by telephone lines or satellite links. While the speed of these means of communication is too slow to distribute tens of thousands of images to transaction workstations, they are fast enough to act as inputs to the high speed distribution network represented by the company LAN.

With medical records in a central repository, they may be called for by any participating hospital. Thus if someone is suddenly taken ill and is taken to a hospital that does not have his medical records, these can be transmitted to the hospital where he is. These records are not merely data on his medical condition, but actual images of those records.

BRIEF DESCRIPTION OF THE DRAWINGS invention will be more readily apparent from the following detailed description and drawings of an illustrative embodiment of the invention in which.

DESCRIPTION OF AN ILLUSTRATIVE EMBODIMENT

Figure 1:
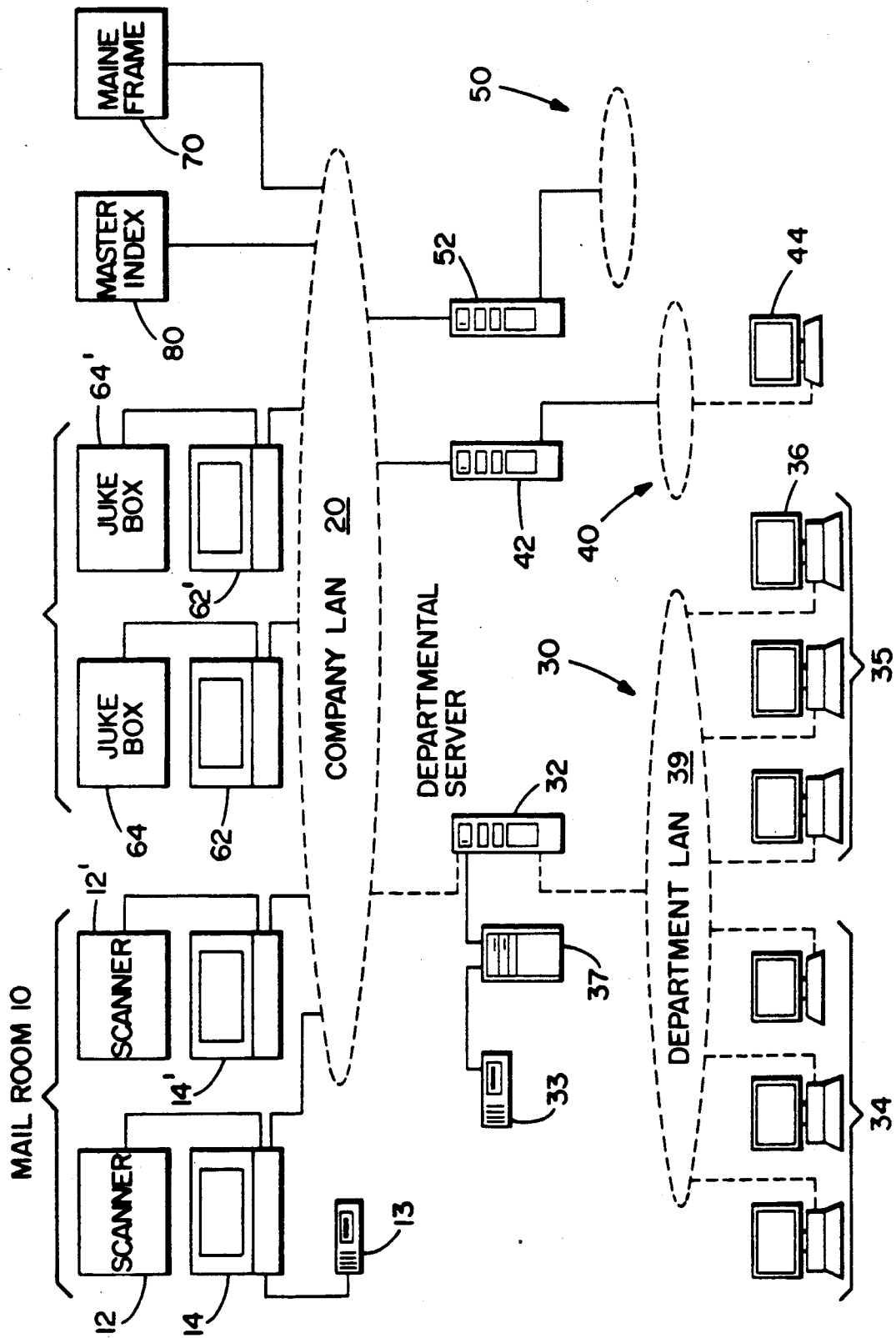
FIG. 1 is a block diagram of a system for transaction processing high volumes of documents.
Figure 2:
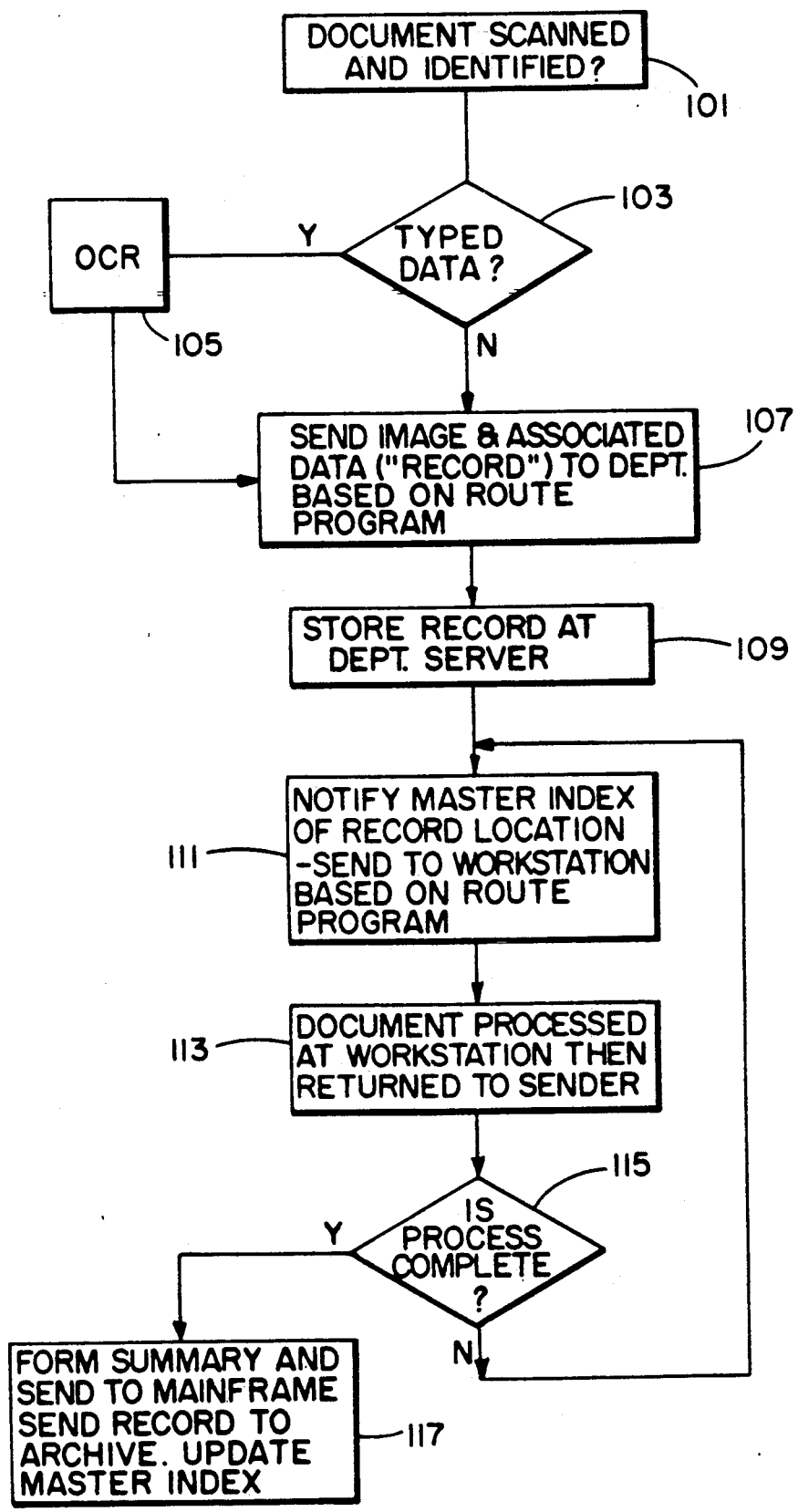
FIG. 2 is a flow chart of the operation of the system shown in FIG. 1 for information input and processing.

In FIG. 1 there is shown a general layout for a system according to the present invention, in which large volumes of documents may be subjected to transaction processing. This system is controlled by preprogrammed computers and FIG. 2 represents a flow chart of system operation according to these programs. These programs may be in many forms and languages and one skilled in the art, using FIG. 2, can form such programs.

The documents, which may number 100,000 or more per day, are received in a mailroom 10. In this mailroom there are one or more scanners 12, 12, into which the documents are fed. These scanners convert the images of the documents into digital signals. This is represented by step 101 in FIG. 2.

An image may require 500,000 bytes to represent a single document. However, there can be a savings in system capacity achieved by compressing the data representing each document. For example, the compression can be according to the CCITT Group 3 or Group 4 compression technique used in facsimile machines. In such a compression scheme, run length encoding is used. For example, if there is a line of white data, for example the space between lines of information, it is encoded merely as a signal that indicates a white level followed by another signal which states how long the strip of white level is. After compression, an image may typically require only 50,000 bytes.

Document scanners are well known in the art and a scanner useful in the present invention is, for example, the DocuScan DS 4000 series, manufactured by Terminal Data Corporation of Simi Valley, Calif. Such a processor is capable of scanning approximately 4,000 documents per hour. Thus in an eight-hour day, 32,000 documents can be processed through one machine, and at least four machines would have to operate in parallel in order to comfortably handle 100,000 documents per day. Naturally, it would be cost effective to utilize fewer machines on close to a 24-hour per day basis.

The scanner may be configured so as to define each image as a two dimensional bit map array. Through interface control, one or more "windows" from the array may be selected for transmission. Further, this scanner is computer controlled and may be preprogrammed to operate within the system.

An OCR 13 is provided with respect to one of the scanners 12. In operation, scanner 12 may be used only for typewritten documents, while scanner 12, is used only for handwritten documents. Alternatively the scanner and computer 14 may be programmed to search relevant portions for "windows" in the image to determine if there is typed or printed information in relevant segments of the document. If there is, it is sent to the OCR 13 for processing and the retrieved data is bundled with the image to form a record. This operation is represented by steps 103, 105 in FIG. 2.

After a document is scanned, its image may be applied through a computer having 3 MIPS capability, for example an IBM to a local area network (LAN) 20. Preferably, this PS/2-70, to a local area network (LAN) 20. Preferably, this network is company wide or agency-wide, so the document image can be sent to any department where it is needed or it can be most efficiently processed.

LAN 20 is preferably a token ring network operating at, for example, 16 megabits/second, and utilizing IBM's Advanced-Program-to-Program-Communications protocol known as "APPC". Such a network allows for extremely high speed data transmission. In particular it will allow for the transmission of a 50,000 byte compressed record of a document image in a fortieth of a second. Thus it allows the high density input from mailroom 10 to be spread through various departments within the company for distributed processing of the information contained in the document based on anticipatory scheduling. In particular, using company LAN 20, the input from scanners 12 may be distributed to departments 30, 40 and 50, as indicated by step 107 of FIG. 2. While only three such departments are shown, additional ones may also be provided.

Departments 40 and 50 are shown in schematic form while department 30 has been shown in more detail to illustrate the details which in fact are duplicated in the other departments.

Because of the computers 14 shown in the mailroom, information can be directed from the scanners to particular departments depending on the type of information in the documents received. In addition, computers 32, 42, 52 acting as the server for each department may be programmed to distribute data directed to that department over department LANs, e.g. LAN 39, for use by workstations 34, 35 and 36 of the department. LAN 39 is preferably a token ring network operating at, for example, 4 megabits/second, which allows for the transmission of a document image in a tenth of a second. LAN 39 also transmits the results of transactions performed at those workstations to server 32 and back onto LAN 20 for distribution to other departments, to an archive arrangement 60 or a mainframe computer 70. In general, the programs in computers 14 and 32, which dictate the information flow, operate under a so-called "route" program. As an alternative to locating the route program in these two computers, a server for the company LAN 20 may be provided in which this information is contained. However, this is a less efficient arrangement.

Basically the route program decides where the image of the document, images of related documents and data extracted by an optical character reader (OCR), which together form the "record", are to be transmitted and when. This routing program considers the document type, overall workload in the company, the capabilities of the department, and special instructions. The special instructions may be created by operator intervention so that privileged customer documents are given priority treatment.

When the data from the scanners 12, 12, reaches the department that they are directed to on the LAN 20, for example department 30, the data is seized by the LAN server 32. If the image contains typed or printed data, server 32 can direct the image to optical character reader 33 where the typed data is converted into digital information and bundled with the image part of the record. While data is being transmitted from server 32 to the workstations on the LAN or while it is being scanned by OCR 33, it may be stored in storage device 37, i.e. step 109 of FIG. 2. Storage device 37 may be a one gigabyte magnetic disk device, which can store up to 20,000 images.

Instead of utilizing optical character recognition at the department level through OCR 33, as noted above, it is also possible to perform optical character recognition in the mailroom on OCR 13.

Because the present invention relates to transaction processing, it is known in advance the route which the image and related data forming a record must follow. Thus, route programming is relatively straightforward. In this case, data for a particular department, for example medicare payments, is directed from the proper scanner to the department which handles that type of claim. In this example it is department 30. When the image and any related data reach server 32, it directs the data to a workstation over the department LAN 39. In addition, a master index 80 is updated with the present location of the record as indicated in step 111 of FIG. 2.

Each of the workstations 34, 35, 36 connected to department LAN 39 may have the same physical construction, for example, a preprogrammed IBM PS/2 Model 50 computer with a high resolution monitor. The computer must be capable of decompressing the compressed image data for presentation on the monitor and thus should have a good MIPS rate. Also, the monitor preferably is a 19 inch 1664×1200 pixel display.

Even though the workstations may be physically the same, the task of these workstations may be broken up according to a processing route which is preestablished. By way of example, the three workstations 34 may be data input stations. These stations have operators which view the image of the document and enter data into a predetermined form, for example, through the use of a keyboard (step 113 of FIG. 2). Because this may be a relatively time consuming process compared to analyzing the claim, a department may have more workstations 34 than other types of workstations.

Workstations 35 may be claim analysis workstations. Once all of the information has been entered into a form by an operator at a workstation 34, the record, including the image and the input data, may be transferred to the server 32 which checks to see if the process is complete (step 115 of FIG. 2). Since no claim determination has been made, server 32 sends the record to a workstation 35 where the claim is analyzed and proper payment is determined. If there is some question which arises in the analysis, an operator at one of workstations 35 can pass the record on to workstation 36 which is a supervisor workstation. A supervisor would have to work on only a relatively few of the forms input at workstation 34 and analyzed at workstation 35.

Server 32 controls the transmission of records between stations 34, 35 and 36 by a route program, as indicated by step 111 of FIG. 2. This may be done most efficiently by keeping track of the number of forms being processed at each workstation and assigning records to the workstation having the least amount of work at the time. Also, server 32 updates the Master Index 80 with information on the present location of the record.

The forms which are created to work with the image of the document may be established by a "form building program" Such programs are well known in the art and are commercially available, for example, the program Per:FORM of the Delrina Technology Corporation of Toronto, Canada, can be used.

Such a program may be arranged to associate various lines of information on the document with entry lines in the form. According to the present invention, forms are developed in conjunction with the type of image observed. This form building process may take place either at computer 14 on the company LAN, the departmental server 32 or at the workstation itself. In constructing the form, "edits" are put in. These are parameters for the data that can be established for any line of the form. This is a means of detecting erroneous entries.

In making a claim determination, an operator at workstation 35 may need to have access to a set of rules which are contained within the mainframe 70. Thus, requests for data from the mainframe can be applied to LAN 39, transmitted through server 32 to company LAN 20 and then to the mainframe or, alternatively, directly to the mainframe via a gateway attached to LAN 39. The results may retrace that path back to the workstation 35. Further, the mainframe computer 70 may have more than one company LAN connected to it via high speed telecommunications links, such that data scanned in mailroom 10 can be transmitted through LAN 20 to the mainframe, and from the main frame through telecommunications links to other LANs (not shown) at remote locations for processing. This will typically be done when all of the departments connected to LAN 20 have more work than they can handle.

As soon as a transaction has been completed, either at workstation 35 or after supervisory review at workstation 36, the record is transmitted to the server 32. If the server 32 is busy at the time, it will store the record in its storage location 37. When time is available the record is transmitted to an archive 60 (Step 117 in FIG. 2). In addition, a summary of the transaction is transmitted to mainframe computer 70. The summary of the transaction stored in mainframe 70 allows customer service representatives to determine on a rapid basis 20 the disposition of any document file.

The master index 80 keeps track of the location of any record and it is updated by the department servers. It is also updated by the computers 62 located in the archive, such that it will know where the full record, including the image of the document, is stored in the archive.

Archive 60 is composed of one or more computers, for example IBM PS/2 Model 70, which are hooked to optical disk storage devices, commonly known as "jukeboxes". Each of these devices may include more than 100 optical disks which can be accessed by a movable head mechanism, much in the manner that an old-fashioned jukebox player accesses records. An optical disk has the capability of storing 2.6 gigabits of information. Thus, one jukebox 64 can hold up to 288 gigabits of data, i.e., the images of 5 million documents.

With the present system image data from a record is typically sent over the company LAN only twice. Once on its way to a department for processing and once on its way to the archive.

Figure 3:
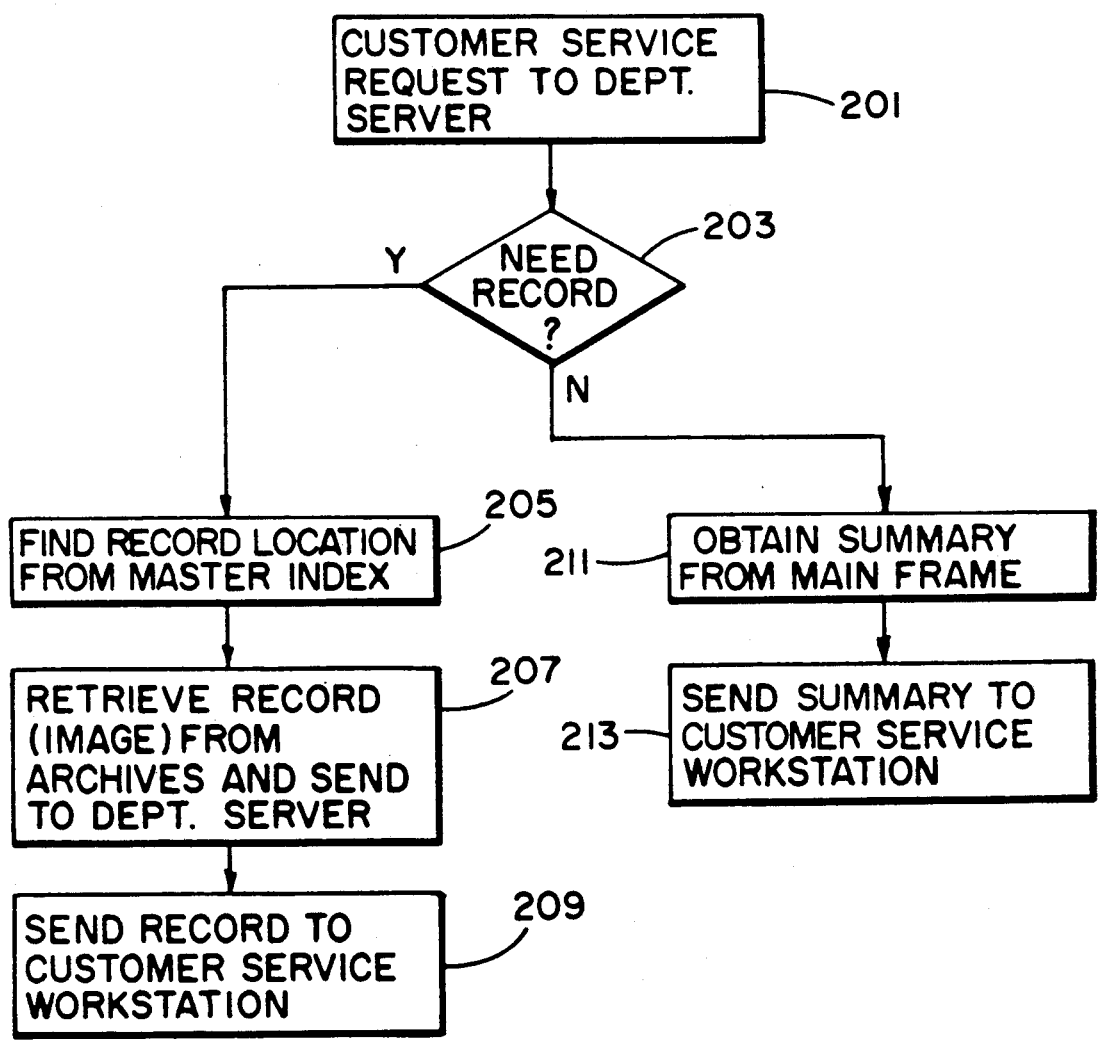
FIG. 3 is a flow chart of the operation of the system shown in FIG. 1 for handling customer service inquiries.

If summary information is needed from the mainframe 70 or image information is need from archive 60 by a customer service representative, for example workstation 44 in department 40, the system operates according to the flow chart of FIG. 3. The representative may request the information from the archive 60 or the mainframe based on whether a record is needed or merely a summary. This request and decision are indicated at steps 201, 203 in FIG. 5. If a record is needed, typically, this is done by an inquiry to the department server 42 which asks the master index 80 for the location of the record. (Step 205). Once this location is determined, the jukebox computer 62 is instructed to fetch the proper disk and then to deliver the image and other data from the transaction to the department server 42 (Step 207). Server 42 in turn sends the record to the workstation 44 of the service representative (Step 209).

If the service representative can handle the inquiry from the customer without a document image, i.e. the record, a request is made of the department server to contact the main frame and obtain the transaction summary as indicated in step 211 of FIG. 3. When the summary is received over LAN 20 from main frame 70, it is delivered by the department server 42 to the customer service workstation 44 as indicated by step 213.

Figure 5:
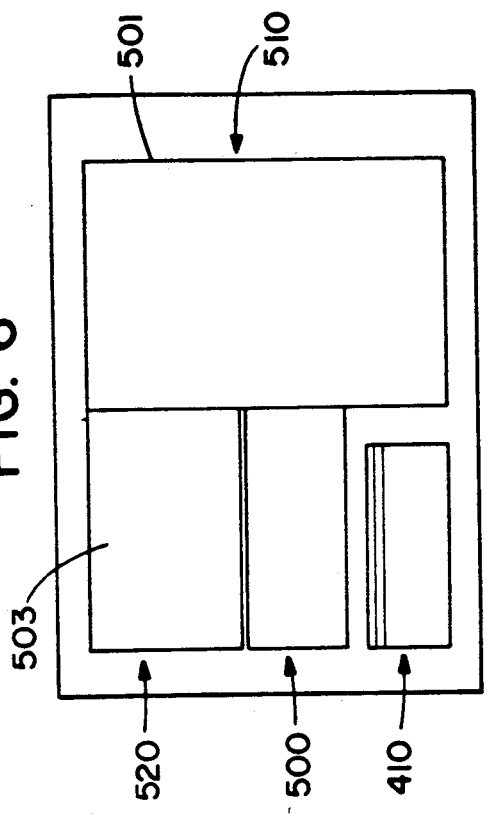
FIGS. 5-8 are views of the screens of the workstation of FIG. 4 during different phases of operation.

As previously noted, the workstations 34, 35 and 36 can be of the same general construction. They further perpetuate the "windows" scheme which is utilized in scanners 12, 12' FIG. 5 illustrates a typical window screen display at a workstation. The top window 400 has a number of icons which provide a menu of operations that can be performed. The bottom window is a visual directory or display of a record. The top window shows that the operator of the workstation has an "in"-box 401 for bringing files to him, a "hold"-box 403 for putting files aside for further processing and an "out"-box 405 for returning files or records to the department LAN 39. A file cabinet icon is provided to start the procedure for retrieving records from archive 60. Also, for convenience a calculator 409 can be selected for doing routine calculations, for example totalling the cost for procedures on a medical claim. The terminal icon 411 selects an emulator routine for access to the main frame computer 70. A horizontal line 113 indicates that the output box has been selected. Below the line there is an indication 415 of the files which are in the out-box, or the other boxes, as selected.

FIG. 5 in the bottom window 410 shows that in the outbox the "Burns" file 115 contains a form 417 which was previously generated by a forms generating program, a note pad 419 for indicating treatment of the file, the image of the document 421 which represents, for example, a medical claim and a supporting document 423.

Figure 4:
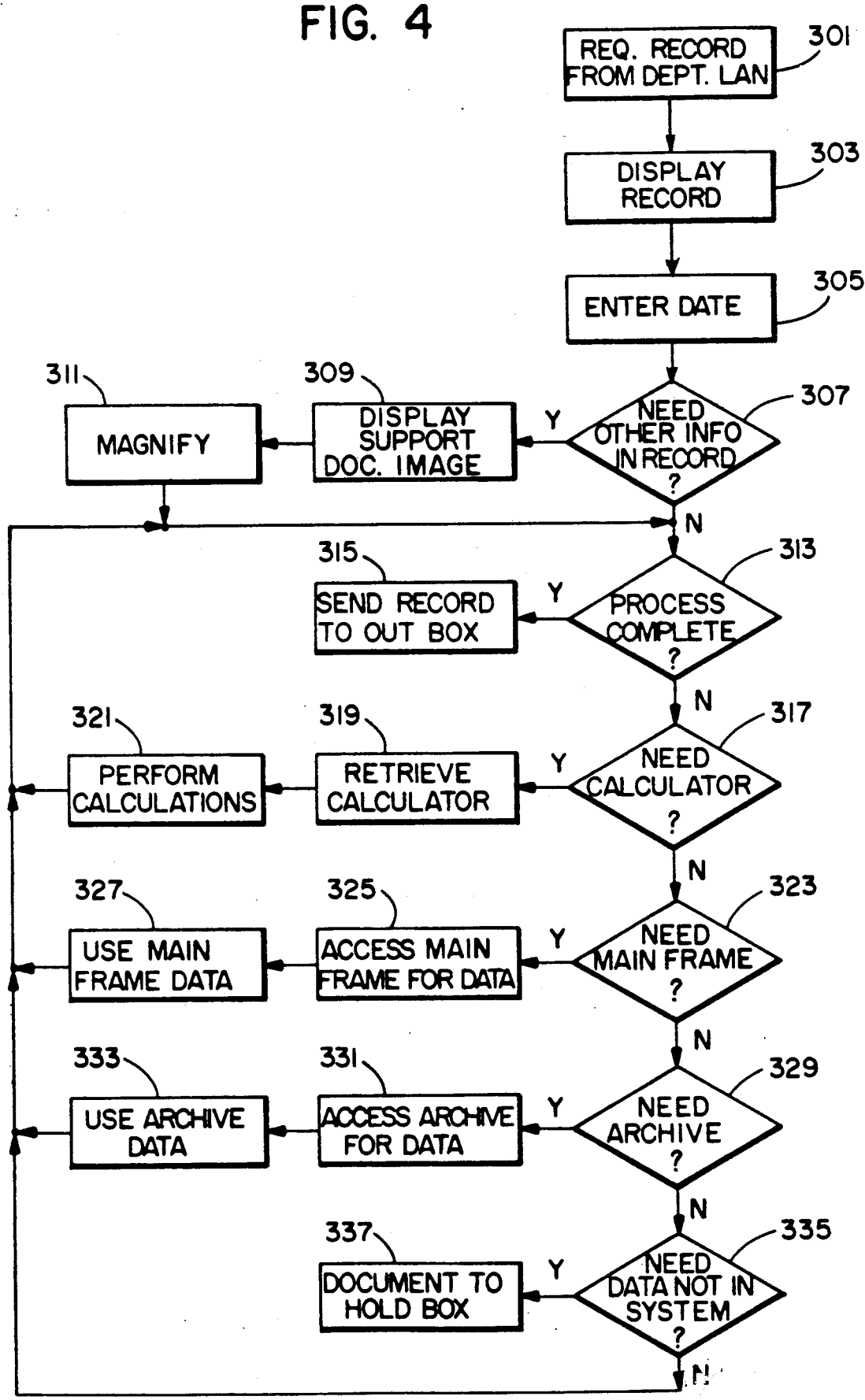
FIG. 4 is a flow chart of a typical operation of a department workstation shown in FIG. 1.

A flow chart for operation of the workstation is shown in FIG. 4. At step 301 the operator requests a document from the department server, e.g., server 32. This is done by selecting icon 401 in FIG. 5. The screen will respond by displaying the visual directory 410 of the record sent to the station by the server.

Figure 6:
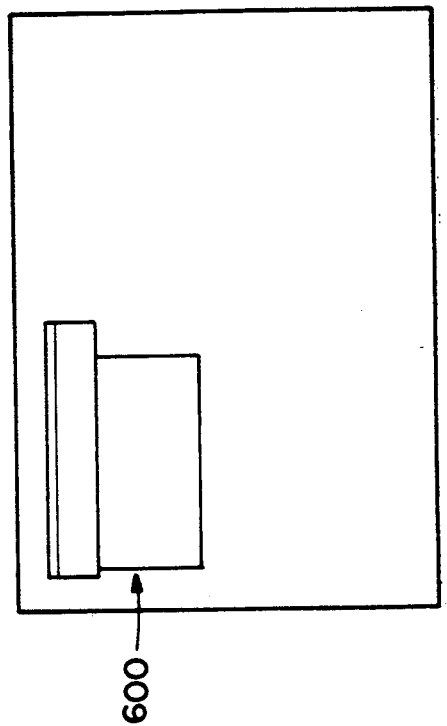

The next step will be to display the form as indicated at step 303 of FIG. 4. This requires the workstation to decompress the image for display. If the document image 421 is selected, it is displayed as shown in FIG. 6, wherein the image of the original document is on the right hand side in a window 510 and the form 417 with data to be filled in, is on the left hand side in a window 520 located above the image of the visual directory in window 410.

The workstation is programmed such that a portion 501 of the image of the original document is highlighted along with an area 503 of the form where the information is to be inserted. In addition, a new window 500 is created which has a magnified version of the form at the top and a magnified version of the document at the bottom. If the document had been typed, the OCR would have automatically filled in the information on the form and it can be merely checked. As an alternative, when data is filled in by an OCR in the prepared form, only those areas of the form where problems are found in the corresponding area of the image of the document may be sequentially highlighted. However, in the illustrated version in FIG. 6, the document was filled out by hand.

Because of the unique arrangement of the magnified fields in window 500, it is an easy matter for an operator to type in the correct data, for example, the social security number. This is represented by step 305 of FIG. 4.

Figure 7:
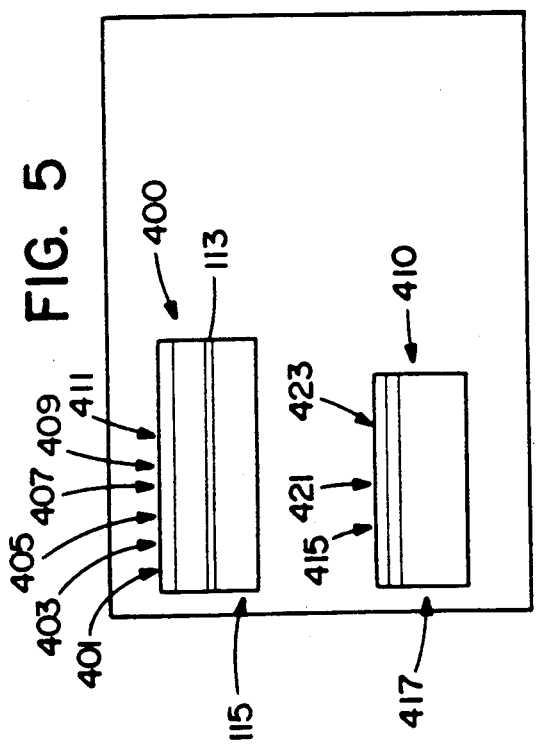

The workstation is programmed such that sections of the image of the original document and the corresponding form portions are sequentially highlighted and magnified such that data entry into the form can be accomplished in an easy and efficient manner. If desired during the course of data input, a supporting document can also be displayed in place of the original. This can be seen by comparing FIG. 6 with FIG. 7 in which a supporting document has been substituted for the main document in window 510. This may be helpful, for example, if the original document is hard to read and the supporting document contains related information, for example the patient,s name. Also, if desired, the visual directory, 20 magnified window and form can be replaced by the supporting document so that the basic claim form and supporting documents are displayed side-by-side. In addition, any portion of the supporting document or the original document can be magnified to aid in data input. To accomplish this the visual directory 410 is used to select the supporting documents to be viewed or magnified. These procedures are represented by steps 307, 309 and 311 of FIG. 4.

After the data input phase, the document may be processed at the same workstation or transferred to a second workstation for processing. If the workstation is being used only for data entry, the processing is complete at the station and the record is put in the out-box, i.e., steps 313 and 315 are performed. However each workstation can be programmed to perform the entire transaction so the system has maximum flexibility in distributing the work.

If the transaction is to be completed at the data input workstation or a document with data already entered is received at a processing workstation, it may be necessary to use the calculator. If so, the form window 520 can be replaced by the menu window 400 and the calculator selected. After the calculation is performed the result can be saved and entered on the form. This process comprises steps 317, 319 and 321 of FIG. 4.

In handling a document it may be necessary to apply a set of complicated rules or to review a list of authorized procedures. Frequently this information is contained in the mainframe computer. To access the mainframe the menu window is displayed and the terminal or 3720 emulation icon is selected. This causes the departmental server to send the request for information over the company LAN 20 to the mainframe, to receive the response and to transmit it back to the requesting workstation over the department LAN 39. Steps 323, 325, 327 represent this process.

If in the course of this transaction processing it is necessary to select information from archive 60, this can be done by selecting the file cabinet icon. When the file cabinet icon is selected it gives access through LAN 39, server 32 and LA 20 to the archive 60. The retrieved record is returned over the same path. This is the procedure of steps 329, 331 and 333 of FIG. 4.

After each operation, the system checks to see if the operator has indicated that processing is complete. If he has, he may send the record to the out-box. However, if it cannot be completed by looking at backup documents, or retrieving information from elsewhere in the system, the operator can put the record in "hold", while information outside the system is sought, as shown by steps 335 and 337.

When a document is sent to an out-box it may be tagged for delivery to the archive or another workstation for processing. For example if a claim is questionable, it may be sent to a supervisor workstation for review.

In addition to the procedures already described, the visual directory at a workstation can be increased in size so as to display the contents of more than one file record. Also, not only can a portion of a selected document image be magnified, but the whole document itself can be magnified.

Figure 8:
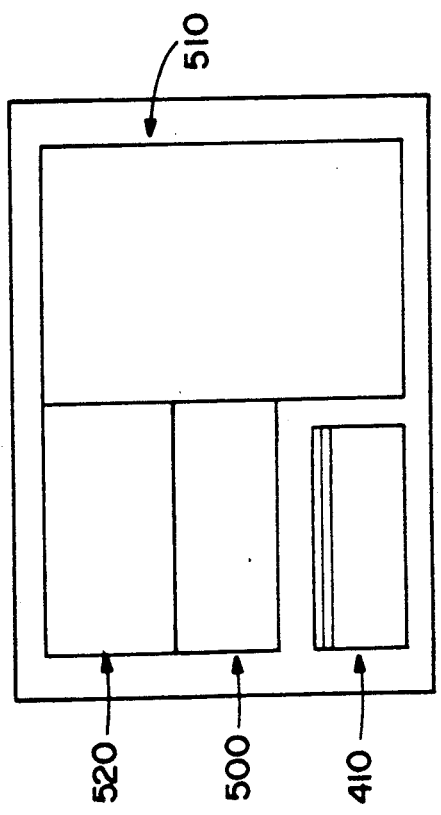

Sometimes information can be obtained from the server 32 and FIG. 8 shows the screen display for a search. This shows that a special window 600 is created for searches. If, for example, the company is a medical insurance company, the search can be by claim number, subscriber name or subscriber number. Further the search can be only in the department or throughout the system.

The creation of the windows on the workstations can be according to the Microsoft "Windows" program, which is commercially available from Microsoft Corporation. The 3270 emulation, which allows access to the main frame, can be achieved with the "Dynacomm 3270" program, which is available from FutureSoft Corporation of Galveston, Tex.

The architecture of the present invention allows for ease of expansion, e.g., by the addition of departments to the company LAN or workstations to the department LAN. Also with the present invention, not only is there distributed processing of the documents based on anticipatory scheduling, but there is distributed programming. In particular, portions of the overall system program are contained in the scanning computer 14, each departmental server 32 and the workstation computers themselves. The flow charts of FIGS. 2-4 show the operations of these programs. While these programs could all be resident in a single company LAN server, it is much more efficient and economical to have it separated into the computers at the locations where the program information is needed.

Because the arrangement according to the present invention allows for distributed processing, the actual processing can take place at almost any location. For example handicapped people or people with young children can work on claims processing at their homes with the information being transmitted to them via telephone modems. While it would be unduly time consuming to try to transmit 100,000 documents by telephone modem, it is perfectly acceptable to transmit a small number of documents to a workstation at home during the night time hours, so that that person can perform the transactions and return them to the company LAN. Access from the home terminal may be by way of a separate department LAN or may merely be an input to one of the existing department LANs.

The present invention provides a particularly useful means of transmitting visual type hospital records, for example, x-rays, EKG's, CAT scans, etc., to remote locations. In particular, the company could be a medical records processing center set up according to the present invention. At this center, images of medical records from subscriber hospitals or other medical providers can be stored in an archive.

If a person suddenly takes ill or is injured, that person is typically transported to the nearest hospital. The ambulance team could radio ahead to this hospital to tell them the name, and perhaps social security number, of the person being transported. If the hospital did not have the person's medical records, the hospital could send a request, for example, by satellite link or telephone line, to the medical records processing center. At the center the record could be located in the archive and the visual image could be transmitted via satellite to the hospital so it would be waiting for the patient's arrival. In addition to hospital records, medical claims could be directed electronically from scanners at a hospital to a medical claim office, thus distributing the claim input procedure from mailroom 10 and workstations 34 to remote hospital locations.

While the invention has been particularly shown and described with reference to preferred embodiments thereof, it will be understood by those skilled in the art that various changes in form and detail may be made therein without the departing from the spirit and scope of the invention.

What is claimed is:

1. A system for electronically engaging in a transaction prompted by a document, comprising:
    scanning means for optically scanning the document to provide electronic image signals indicative of the image of the document, at least said image signals constituting a record;
    main local area network means onto which said record is placed;
    at least two servers connected to said main network means for receiving the records, each server communicating its status with the other and being programmed with a routing program such that one of the servers elects to accept a record for processing based in part on the status of each server;
    secondary local area network means onto which at least one of said servers places said record, said secondary network means being capable of operating at a lower speed than said main network; and
    at least one workstation connected to said secondary local area network means, said workstation modifying said record according to predetermined transactions, and returning said modified record to the server connected to said secondary local area network.

2. A system as claimed in claim 1 further including archive storage means for electronically storing large numbers of modified records, said server being adapted to direct said modified records to said archive means and retrieve modified records from said archive.

3. A system as claimed in calim 1 wherein said scanning means further includes an optical character reader for extracting data from the record of a scanned document and including the data in the record.

4. A system as claimed in claim 1 wherein said scanning means includes a plurality of electronic scanners connected to said main network and providing electronic iamge signals indicative of the image of the document.

5. A system as claimed in claim 1 further including a mainframe computer connected to said main network, said mainframe computer receiving summaries of said record from said servers and supplying said servers with stored data, including previously supplied summaries.

6. A system as claimed in claim 5 wherein at least one of said server further includes an optical character recognition means for extracting data from records received by said servers and including the extracted data in the record.

7. A system as claimed in claim 1 further including a master index storage means, said servers and scanner supplying information to said master index storage means on the location of a record in the system, said master index storage means supplying said servers with previously stored information on the location in the system of records.

8. A system as claimed in claim 7 further including an archive storage means for electronically storing large numbers of modified records, said servers being adapted to direct said modified records to said archive means and retrieve modified records from said archive, said archive storage means supplying said master index storage means with information on the location of records within said archive storage means.

9. A system as shown in claim 1 further including a server storage means connected to at least one of said servers for storing records received from, and to be transmitted to, said main network means and said secondary network means.

10. A system as claimed in claim 1 further including means located at said workstation for creating an electronic form to contain information from the image of the document, said form being a part of said record, and information added to said form fro msaid document image creating a modified record, said form being arranged such that areas of the form electronically correspond to areas of the document.

11. A system as claimed in claim 10 further including edit means for establishing parameters on information added to said form and inhibiting the addition of information that is not within the parameters.

12. A system as claimed in claim 1 wherein the status of each server includes at least the number of unprocessed records at workstations connected to said processor.

13. A system as claimed in claim 1 further including an archive storage means for electronically storing large numbers of modified records, said archive store means being connected to said main local area network means, and said scanning means directing records to said servers and said archive storage means simultaneously.

14. A system for electronically engaging in a transaction prompted by a document, comprising:
at least one electronic scanner means for optically scanning the document to provide electronic image signals indicative of the image of the document, at least the image signals constituting a record;
a main local area network means onto which said record is placed;
at least two department servers connected to said main network means for receiving the records, said scanner means operating according to a first route program so as to direct the records over the main network means to the appropriate department server according to predetermined criteria;
a department local area network means for each department server, each department server placing records onto its department network means;
at least two workstations connected to each department network means, said department servers operating according to a second route program so as to direct the records over its department network means to the appropriate workstation according to predetermined criteria, said work station modifying said records according to predetermined transactions, and returning said modified records to said server.

15. A system as claimed in claim 14 further including an archive storage means for electronically storing large numbers of modified records, said department servers being adapted to direct said modified records to said archive means.

16. A system as claimed in claim 15 further including a master index storage means, said serves and scanner supplying information to said master index storage means on said master index storage means supplying said server with previously stored information on the location of identified records, said archive storage means also supplying said master index storage means with information on the location of records within said archive storage means.

17. A system as claimed in claim 16, further including optical character recognition means connected to said main local area network for extracting data from the image of the document and including it in the record.

18. A system as claimed in claim 17 further including means at said workstations for creating an electronic form to contain information from the image of the document, said form being a part of said record, and information added to said form from said document image creating a modified record, said form being arranged such that areas of the form electronically correspond to areas of the document.

19. A system as claimed in claim 18 further including edit means at said workstation for establishing parameters on information added to said form and inhibiting the addition of information that is not within the parameters.

20. A system as claimed in claim 18 wherein the workstations are programmed to display windows, at least one window has the magnified image of an area of the form adjacent a magnified image of an area of the document for ease of data input.

21. A system as claimed in claim 14 wherein the status of each server includes at least the number of unprocessed records at workstations connected to said processor.

22. A system as claimed in claim 14 further including an archive storage means for electronically storing large numbers of modified records, said archive store means being connected to said main local area network means, and said scanning means directing records to said servers and said archive storage means simultaneously.

23. A method of electronically transaction processing a document comprising the steps of:
scanning the document to create an electrnic image of the document which is part of a record;
transmitting the record over a main local area network to one of a plurality of department servers, according to a routing routine resident in said servers;
exchanging information between said servers over said main local area network about the status of said servers;

determining, according to the routing routine, which server will elect to process a record based on the status of the servers;

distributing the record from the department server electing to process the record to one of the plurality of workstations according to the routing routine;

electronically creating a form at the workstation as part of the record;

displaying the record in window type screen segments for data input;

processing the document by manipulating the data in the record; and returning the data to the department server for storage and action based on the processing.

24. A method as claimed in claim 23 further including the step of optically and electronically reading data input on the document to create data signals included in the record.

25. A method as claimed in claim 23 further including the steps of transmitting modified records from said department servers over the main network means to an archive storage means, and storing said records in said archive storage means.

26. A method is claimed in claim 25 further include the step of monitoring the location of a record while in the system and storing the location information in a master index.

27. A method as claimed in claim 23 further including the step of accessing a main frame computer connected to the main network means via the department server.

28. A method as claimed in claim 23 wherein the displaying step includes the step of sequentially relating segments of the images of the document and the form to each other.

29. A method as claimed in claim 28 wherein the displaying step further includes the step of creating a screen window in which the corresponding segments of the image of the document and the form are magnified and arranged adjacent each other.

30. A method as clamied in claim 23 wherein the displaying step includes the step of magnifying any part of the record for display.

* * * * *